United States Patent Office 3,096,304
Patented July 2, 1963

3,096,304
METHOD FOR THE PREPARATION OF ORGANOSTANNOSILOXANE
Toshizo Ishizuka, Tokyo, Mareyoshi Momoi, Hodogaya-ku, Yokohama, and Ryuichi Fujita, Tokyo, Japan, assignors to Shin-Etsu Chemical Co., Ltd., Tokyo, Japan, a corporation of Japan
No Drawing. Filed Nov. 24, 1959, Ser. No. 855,025
Claims priority, application Japan Dec. 2, 1958
2 Claims. (Cl. 260—46.5)

This invention relates to a method for preparing organosiloxane comprising in its molecular composition Sn—O bond (so-called stannoxane bond) and shall hereafter be referred to as a method for preparing organostannosiloxane.

With respect to the preparation of organostannosiloxane, only two methods have been known heretofore, one of which comprises the co-hydrolysis of organochlorosilane and organotin chloride (cf. Andrianov, Ganina and Khrustaleva: Chem. Abst. 51, 3487 (1957)), and the other comprises formation of triphenyl-triphenylsiloxystannane [$(C_6H_5)_3SnOSi(C_6H_5)_3$] by the reaction between triphenylchlorostannane [$(C_6H_5)_3SnCl$] and sodium triphenyl silanolate [$(C_6H_5)_3SiONa$] (cf. Papetti and Post: J. Org. Chem. 22, 526, (1957)).

U.S. Serial No. 838,438, filed on September 8, 1959, now abandoned, discloses a method for preparing organostannosiloxane by reacting organosilicon compounds having directly attached to silicon atom hydroxy or alkoxy radical with organotin compounds of the general formula selected from the group of

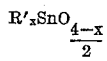

and $R''_ySn(OOCR''')_{4-y}$ (where R' and R'' are either of the same or different kind, and are selected from the group consisting of alkyl, aryl, alkaryl, aralkyl and alkenyl radical, R''' is alkyl radical and x and y are integers of from 1–3). Further studies on the subject have led the present inventors to obtain another method for easily preparing organostannosiloxane by reacting organosiloxane not necessarily having any OR radical (where R is hydrogen or alkyl radical) directly attached to silicon atom with organotin oxides.

The object of this invention is to provide a new method for preparing organostannosiloxane quite different from the above-mentioned well-known methods, for the purpose of easily preparing, on a commercial scale, varieties of organostannosiloxane. Other objects, features, capabilities and advantages will be apparent from the description and claims which follow.

This method is characterized by reacting at above 80° C. organosiloxane not necessarily having any hydroxy or alkoxy radical directly attached to silicon atom with organotin oxides of the general formula,

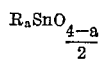

(where R is selected from the group consisting of organic radicals such as alkyl, aryl, alkaryl, aralkyl and alkenyl radicals, and a is an integer from 1–3), the composition of the organostannosiloxane thus produced varying according to the composition of organosiloxane and organotin oxides used as starting materials. The mechanism of formation has not yet been made clear, but, according to the studies conducted by the inventors, the organotin compounds are supposed to cleave Si—O—Si bonds in the organosiloxane and form Si—O—Sn bonds, as follows:

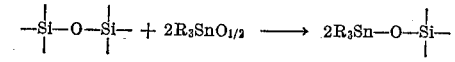

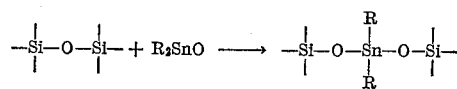

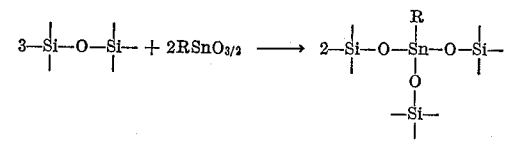

In the present invention, it is necessary to keep the temperature of the reaction system at above 80° C., below which the above-mentioned cleaving of the bonds will not take place. In order to give a satisfactory reaction velocity, it is preferable to keep the temperature at 100° C. or above.

Organosiloxanes employed in the invention are well-known ones such as dimethylpolysiloxane, octamethylcyclotetrasiloxane, octaphenylcyclotetrasiloxane, methylphenylpolysiloxane, etc., not necessarily comprising OR-radicals in their composition, which was not known to the inventors at the time when the application for the patent was made on our previous invention. The fact that some limitation on the organosilicon compounds employed as starting materials has been removed is one of the improvements the present invention has over the previous one. As to the other starting material of the general formula of

it may be selected from the group consisting of well-known compounds such as dimethyltin oxide, dibutyltin oxide, diphenyltin oxide, bis(tri-n-butyl tin)oxide, etc.

Organostannosiloxane prepared by the method of the present invention may present oily to rubbery appearance depending upon the kinds of organosiloxane and organotin compounds used as starting materials, so that just like the well-known organosiloxane, it may be employed widely as lubricant, dumper oil, elastomer, paste, etc. The organostannosiloxane oil, gives better lubricity than the organosiloxane oil, and the rubber-like organostannosiloxane when mixed with a curing agent such as organosilicate, polyorganosilicate and diorganosiloxane oil containing hydrogen atom directly attached to silicon atom, may be cured at normal temperature, hence serves as an excellent material for putty for electric insulation, for filler for crevices for covering material for giving water repellency and for adhesive agent.

The following examples illustrate certain ways in which the principle of the invention has been applied, but it is not to be construed as limiting the broader aspects of the invention.

*Example 1*

To 60 gr. of octamethylcyclotetrasiloxane

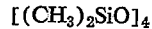

0.4 gr. of dibutyltin oxide was added, and the mixture was stirred at 80° C. In about 5 hours, white powder of dibutyltin oxide gradually disappeared and while stirring was continued at 100° C. for about 6 hours more, the powder was completely dissolved to give a clear liquid. The fact indicated the absence of dibutyltin oxide, that is dibutyltin oxide was completely consumed in the reaction, proving that the organostannosiloxane was prepared.

Example 2

A mixture with a viscosity of 3.54 cs./25° C. consisting of octamethylcyclotetrasiloxane [(CH$_3$)$_2$SiO]$_4$ and 59.6 gr. of tributyltin oxide was stirred at 170° C. for 6 hours. When the liquid was distilled, no distillate corresponding to the starting materials [(CH$_3$)$_2$SiO]$_4$—B.P. 175° C./760 mm. Hg—and tributyltin oxide—B.P. 180–185° C./3 mm. Hg—was obtained. The amount of the distillate collected at 210° C./below 3 mm. Hg was only 32% of the total and the rest remained residue. This proves that [(CH$_3$)$_2$SiO]$_4$ reacted with tributyltin oxide giving organostannosiloxane. The viscosity of the residue was 7.73 cs./25° C., higher than the viscosity of the starting mixture which was 3.54 cs./25° C. The Sn content was 25.3%.

Example 3

60 gr. of octamethylcyclotetrasiloxane and 2 gr. of dibutyltin oxide were mixed and stirred at 150° C. In about 50 minutes white powder of dibutyltin oxide disappeared and the mixture became transparent. While the stirring was continued at the same temperature, in about 5 hours, the viscosity gradually became high until it reached 100,000 cs./25° C. When let stand at normal temperature for several months the organostannosiloxane thus prepared gradually gained is viscosity, turning into a more viscous one.

When 60 gr. of octamethylcyclotetrasiloxane and 4 gr. of dibutyltin oxide were mixed and stirred at 150° C., white powder disappeared in about 2.5 hours to give transparent organostannosiloxane. During the process, the viscosity of the system gradually increased until it reached 100,000 cs./25° C. Sn content of the product was 3.08%.

Example 4

6 gr. of dibutyltin oxide was mixed with 60 gr. of dimethylsiloxane oil, which has a constitutional formula of (CH$_3$)$_3$Si—O—[Si(CH$_3$)$_2$—O]$_n$—Si(CH$_3$)$_3$ with a viscosity of 153 cs./25° C., and the mixture was heated at 120–130° C. while stirring. In about 15 hours, white powder of dibutyltin oxide disappeared to give a clear liquid. The viscosity of the produced organostannosiloxane was 482 cs./25° C. 2 gr. of dibutyltin oxide was mixed with said organostannosiloxane and stirring was continued at 120–130° C. for about 6 hours. The mixture became transparent and the viscosity of said organostannosiloxane produced reached about 80,000 cs./25° C.

Example 5

9 gr. of dibutyltin oxide was mixed with 60 gr. of phenylmethylsilicone oil with a viscosity of 351.8 cs./25° C. which has a constitutional formula of (CH$_3$)$_3$Si—O—[Si(CH$_3$)$_2$—O]$_m$—
[Si(C$_6$H$_5$)$_2$—O]$_n$—Si(CH$_3$)$_3$ the mole ratio of methyl and phenyl radical thereof being 3:1 and the mixture was heated at 130–135° C. while stirring.

The mixture became gradually clear and in 8 hours it became completely transparent. Thus produced organostannosiloxane showed the viscosity of 460 cs./25° C. and Sn content of 6.22%.

Example 6

20 gr. of octamethylcyclotetrasiloxane, 22.5 gr. of dibutyltin oxide and 40 gr. of xylene were mixed and heated at 135—140° C. while stirring. The white powder of dibutyltin oxide in the mixture gradually disappeared. In about 3 hours, the mixture gave a clear solution of high viscosity.

Then said solution was distilled under reduced pressure whereby xylene was distilled out and clear, rubbery organostannosiloxane containing 15.5% Si and 23.9% Sn was obtained.

Example 7

A mixture of 19.8 gr. of octaphenylcyclotetrasiloxane [(C$_6$H$_5$)$_2$SiO]$_4$—white crystal—24.9 gr. of dibutyltin oxide and 45 gr. of xylene was stirred at elevated temperature of 135–140° C. At first the solution was very muddy, because at the temperature [(C$_6$H$_5$)$_2$SiO]$_4$ was dissolved in xylene but dibutyltin oxide was not; however, as the stirring was continued at the same temperature, the mixture gained in clearness and in 13 hours it became a transparent solution. After another 8 hours' stirring at the same temperature, a part of the solution was moved on to a watch-glass where it was let stand for air-drying, and then was heated at 100° C. to remove xylene, obtaining transparent organostannosiloxane of extremely high viscosity. The product, after being heated at 200° C. for 3 hours showed no change at all.

Example 8

60 gr. of octamethyltrisiloxane, which has a constitutional formula of (CH$_3$)$_3$Si—O—Si(CH$_3$)$_2$—O—Si(CH$_3$)$_3$ with a viscosity of 1.06 cs./25° C., and 10 gr. of dibutyltin oxide were mixed and heated at 145–150° C. while stirring. In about 10 hours, the white powder of dibutyltin oxide was completely dissolved and clear organostannosiloxane having a viscosity of 1.6 cs./25° C. was obtained.

Example 9

20 gr. of dibutyltin oxide was mixed with 60 gr. of dimethylsilicone oil with a viscosity of 20 cs./25° C. and was heated while stirring. At 120° C., the mixture became muddy, which, on further heating, gradually became clear as the mixture gained in viscosity. About 5 hours later, the mixture became transparent and the viscosity reached its constant value of 980 cs./25° C.

Example 10

Dibutyltin oxide was mixed with dimethylsilicone oil with a viscosity of 100 cs./25° C. and was heated to 120° C. while stirring, so as to prepare organostannosiloxane whose Sn content varied as given in the following table. When tested with Shell four-ball lubricant tester, the organostannosiloxane showed that the higher the Sn content, the better its lubricity. The conditions of this abrasion test and the results are shown below.

Conditions:
    Revolution _____r.p.m.__ 600
    Load _____kg__ 40
    Time expended _____min__ 10
    Dia. of steel balls _____inches__ ½

Results:

| Sn content (dibutyltin oxide/dimethyl-silicone) | Viscosity (cs./25° C.) | Scar diameter | |
|---|---|---|---|
| | | Normal temp. | 150° C. |
| 0 | 100 | 0.99 | 1.21 |
| 0.17 | 100 | 0.95 | 1.08 |
| 0.33 | 105 | 0.86 | 1.04 |
| 1.0 | 110 | 0.86 | 0.99 |
| 2.0 | 120 | 0.71 | 0.96 |
| 3.3 | 140 | 0.74 | 0.90 |

Example 11

100 weight parts of organostannosiloxane obtained as in Example 4, having a viscosity of 80,000 cs./25° C. and 1 weight part of ethyl silicate were uniformly mixed and let stand at room temperature. After the lapse of a day the viscosity was observed to have increased, and in 7 days, the mixture had become hard, non-tacky, colorless, transparent, elastic gel.

A mixture of 100 weight parts of the above-mentioned organostannosiloxane and 50 weight parts of Celite–270

(diatomaceous earth prepared by Johns-Manville, U.S.A.) was kneaded on a three-roll mill, obtaining a fluid rubber compound with a viscosity of 100,000,000 cs./25° C. When 1 weight part of ethyl silicate was added to said compound and uniformly mixed, the mixture, after being let stand at room temperature for a day, began to cure itself, which came to an end in 7 days, yielding non-tacky elastomer, insoluble in benzene.

What we claim is:

1. Process for non-catalytic preparation of organo-stannosiloxane elastomer, vulcanizable at room-temperature, consisting essentially of
    (1) reacting butyltin oxide with dimethylsilicon oil, said oil having

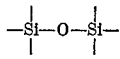

skeletons with the indicated unsatisfied valences of Si being bonded to methyl groups, said reaction effected above 80° C., and
    (2) adding ethyl silicate to the resultant product.

2. Process for non-catalytic preparation of organo-stannosiloxane elastomer, vulcanizable at room-temperature, consisting essentially of
    (1) reacting butyltin oxide with dimethylsilicon oil, said oil having

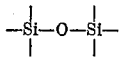

skeletons with the indicated unsatisfied valences of Si being bonded to methyl groups, said reaction effected above 80° C., and
    (2) adding methylhydrogen-polysiloxane to the resultant product.

References Cited in the file of this patent

UNITED STATES PATENTS

| | | |
|---|---|---|
| 2,842,516 | Nitzsche et al. | July 8, 1958 |
| 2,902,467 | Chipman | Sept. 1, 1959 |
| 2,927,907 | Polmanteer | Mar. 8, 1960 |
| 2,998,440 | Foster et al. | Aug. 27, 1961 |

FOREIGN PATENTS

| | | |
|---|---|---|
| 216,878 | Australia | Aug. 29, 1958 |